United States Patent [19]

Passera et al.

[11] Patent Number: 5,909,681
[45] Date of Patent: *Jun. 1, 1999

[54] COMPUTER SYSTEM AND COMPUTERIZED METHOD FOR PARTITIONING DATA FOR PARALLEL PROCESSING

[75] Inventors: Anthony Passera, Watertown, Mass.; John R. Thorp, Columbia, Md.; Michael J. Beckerle, Needham; Edward S. A. Zyszkowski, Newton, both of Mass.

[73] Assignee: Torrent Systems, Inc., Cambridge, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/624,844

[22] Filed: Mar. 25, 1996

[51] Int. Cl.⁶ .................................................. G06F 15/163
[52] U.S. Cl. ........................ 707/8; 707/3; 707/6; 707/10; 704/232; 706/16
[58] Field of Search .................................. 395/603, 604, 395/608, 610, 613; 707/3, 6, 8, 10; 704/232; 706/16

[56] References Cited

U.S. PATENT DOCUMENTS

| | | | |
|---|---|---|---|
| 4,760,604 | 7/1988 | Cooper et al. | 382/15 |
| 4,870,568 | 9/1989 | Kahle et al. | 364/200 |
| 4,876,643 | 10/1989 | McNeill et al. | 364/200 |
| 4,975,975 | 12/1990 | Filipski | 382/38 |
| 5,060,278 | 10/1991 | Fukumizu | 382/14 |
| 5,095,443 | 3/1992 | Watanabe | 395/11 |
| 5,095,522 | 3/1992 | Fujita et al. | 395/200 |
| 5,179,683 | 1/1993 | Murakami et al. | 395/425 |
| 5,239,594 | 8/1993 | Yoda | 382/15 |

(List continued on next page.)

FOREIGN PATENT DOCUMENTS

WO 94/01823  1/1994  WIPO .............................. G06F 15/18

OTHER PUBLICATIONS

Hedberg, "Parallelism speeds data mining". IEEE, vol. 3, issue 4, pp. 3–6, Dec. 24, 1995.
Mesrobian et al., "Exploratory Data Mining and Analysis Using Conquest", IEEE. pp. 281–286, 1995.
Gerber, Bob, "Informix Online XPS." p. 463, SIGMOD 1995.
Baru, Chaitanya, et al, "An Overview of DB2 Parallel Edtion." pp. 460–462, SIGMOD 1995.
Anselm Blumer et al., "Learnability and the Vapnik–Chervonenkis Dimension," Oct. 1989, vol. 36, No. 4, pp. 929–965.

(List continued on next page.)

Primary Examiner—Thomas G. Black
Assistant Examiner—Jean R. Homere
Attorney, Agent, or Firm—Wolf, Greenfield & Sacks, P.C.

[57] ABSTRACT

A computer system splits a data space to partition data between processors or processes. The data space may be split into sub-regions which need not be orthogonal to the axes defined by the data space's parameters, using a decision tree. The decision tree can have neural networks in each of its non-terminal nodes that are trained on, and are used to partition, training data. Each terminal, or leaf, node can have a hidden layer neural network trained on the training data that reaches the terminal node. The training of the non-terminal nodes' neural networks can be performed on one processor and the training of the leaf nodes' neural networks can be run on separate processors. Different target values can be used for the training of the networks of different non-terminal nodes. The non-terminal node networks may be hidden layer neural networks. Each non-terminal node automatically may send a desired ratio of the training records it receives to each of its child nodes, so the leaf node networks each receives approximately the same number of training records. The system may automatically configures the tree to have a number of leaf nodes equal to the number of separate processors available to train leaf node networks. After the non-terminal and leaf node networks have been trained, the records of a large data base can be passed through the tree for classification or for estimation of certain parameter values.

21 Claims, 8 Drawing Sheets

5,909,681

Page 2

U.S. PATENT DOCUMENTS

| | | | |
|---|---|---|---|
| 5,261,065 | 11/1993 | Urabe et al. | 395/425 |
| 5,307,485 | 4/1994 | Bordonaro et al. | 395/600 |
| 5,428,783 | 6/1995 | Lake | 395/650 |
| 5,495,606 | 2/1996 | Borden et al. | 395/600 |
| 5,515,531 | 5/1996 | Fujiwara et al. | 395/600 |
| 5,537,593 | 7/1996 | Diamond et al. | 395/650 |
| 5,615,127 | 3/1997 | Beatty et al. | 364/489 |

OTHER PUBLICATIONS

Wei–Ming Lin et al., "Algorithmic Mapping of Neural Network Models Onto Parallel SIMD Machines," IEEE Transactions on Computers, Dec. 1991, vol. 40, No. 12, pp. 1390–1401.

S.T. Kim et al., "Algorithmic Transformations for Neural Computing and Performance of Supervised Learning on a Dataflow Machine," IEEE Transactions on Software Engineering, Jul. 1992, vol. 18, No. 7, pp. 613–623.

Jeffrey Scott Vitter et al., "Learning in Parallel," Information and Computation, Brown University, 1992, pp. 179–202.

Ananth Sankar et al., "Neural Tree Networks," CAIP Center and Dept. of Electrical Engineering, Rutgers University, 1991, pp. 281–302.

Manavendra Misra, "Parallel Environments for Implementing Neural Networks," Neural Computing Surveys, vol. 1, 1997, pp. 48–60.

Ananth Sankar et al., "Combining Networks and Decision Trees," Proceedings of SPIE Int'l Symp. on Optical Eng. and Photonics in Aerospace, date unknown.

-BuildModel_Master~89
    -make largest full binary tree having NoOfEndNets or less end nodes~90
    -add non-terminal nodes to lowest level until have NoOfEndNets end nodes~92
    -associate a RecordRatio of 1/NoOfEndNets with each end node~94
    -associate with each non-terminal node a RecordRatio equal to the sum of the RecordRatios of its child nodes~96
    -supply a set of training records to root node~98
    -for each level of tree having non-terminal nodes, starting from the root down~100
        -for each non-terminal node in level~102
            -from a set of N record parameters, find the ParameterOfGreatestSpread taken over all record supplied to the tree node~104
            -create a two level neural network having an input for each of the N record parameters and having one output~106
            -until training converges~108
                -for each training record supplied to the tree node~109
                    -train the weights of the node's network's, appling the record's N parameters to the inputs of the net, and the record's ParameterOfGreatestSpread to its ouput~110
            -once the tree node's network has been trained, for each training record passed to the node~112
                -re-apply the record's N parameters to the network's inputs~114
                -order the record in a ScoreList by the value of net's output~116
            -select a SplitPoint such that the ratio of records above and below SplitPoint in ScoreList equals the ratio between the RecordRatios of the node's two child nodes~118
            -send all records above SplitPoint to one child node, and all of those below to the other child node~120
    -create a compressed representation of the d-tree, including of the weight vector and SplitPoint of each non-terminan node's neural net~122
    -for each successive one of the tree's end nodes~124
        -cyclically distribute the set of records supplied to that end node to a successive one of NoOfProcessors separate processors~126
    -have each of the NoOfProcessor processors execute BuildModel_Slave for each set of end node records destributed to it~128
    -once have received compressed representations of the EndNet for each of the d-tree's end nodes, append the compressed representation of each such EndNet to its appropriate place in the compressed d-tree representation, to create a compressed representation of the complete tree network~130
    -store compressed complete tree on disk~131

FIG. 3

-BuildModel_Slave~148
    -create EndNet, a hidden layer neural network, for the set of end node records having specified list of I input and J output parameters from the set of N parameters used in the d-tree~150
    -until training converges~151
        -for each record in the end node set~152
            -use the record to train the EndNet, appling the values of its I and J parameters, respectively, to the EndNet's input and outputs.~154
    -create a compressed representation of the EndNet~156
    -send the compressed representation to the Master processor~158

FIG. 13

ApplyModel_Master~170
    -if the main data set has not previously been partioned into NoOfProcessors partions, do so~172
    -distribute a copy of the compressed complete tree network to each of the NoOfProcessor processors~174
    -cause each such processor to run ApplyModel_Slave on its associated partion of the main data set~176
    -once receive classification results from such processors, report them~178

FIG. 16

-ApplyModel_Slave~190
    -for each record in processor's partion of the main data set~192
        -make the root of the compressed complete tree network the CurrentNode~194
        -until the CurrentNode is no longer a non-terminal node~196
            -multiply record's N parameters by the CurrentNode's associated weight vector to produce a network output value~198
            -select one of the CurrentNode's two child nodes the new CurrentNode, depending on whether the node's network output value for the record is greater than or less than the node's SplitPoint~200
        -apply the record's I input parameters to the CurrentNode's compressed EndNet~202
        -classify the record based on the value of the J outputs of the EndNet, according to specified classification scheme~204
    -send specified results of classification to Master~206

FIG. 17

COMPUTER SYSTEM AND COMPUTERIZED METHOD FOR PARTITIONING DATA FOR PARALLEL PROCESSING

FIELD OF THE INVENTION

The present invention relates to computer systems for analyzing, and computing with, sets of data, such as, for example, extremely large data sets.

BACKGROUND OF THE INVENTION

As computing power has grown, it has become increasingly practical to process data, and, in particular, large amounts of data, in new and useful ways. For example, the term "data base mining" has been used to describe the practice of searching vast amounts of data for commercially, medically, or otherwise important patterns, patterns which would probably have been impossible to find by human pattern matching, and which probably would have taken too long to have found with prior generations of computer equipment.

For example, one common use of data base mining is for corporations to search through data bases containing records of millions of customers or potential customers, looking for data patterns indicating which of those customers are sufficiently likely to buy a given product to justify the cost of selecting them as targets of a direct marketing campaign. In such searches, not only are millions of records searched, but hundreds, or even thousands of fields within each record. Such data base mining has proven much more successful in selecting which customers are most likely to be interested in a given new product than prior methods.

Similarly, data base mining can be used for scanning vast numbers of medical records to look for subtle patterns associated with disease; for scanning large numbers of financial transactions to look for behavior likely to be fraudulent; or to study scientific records to look for new casual relationships.

Because they often involve a tremendous number of records, and are often seeking patterns between a large number of fields per record, data base mining operations tend to require huge amounts of computation. This, in combination with the fact that most data base mining operations can be easily partitioned to run on separate processors, has made data base mining one of the first major commercial uses of massively parallel computers. But even when run on most commercially available parallel systems many data base mining functions are relatively slow because of their tremendous complexity. Therefore there is a need to improve the speed at which such tasks can be performed.

Neural nets are a well known device for automatically selecting which patterns of values in certain source fields of records are likely to be associated with desired values in one or more target fields. A neural network normally includes an input layer comprised of a plurality of input nodes, an output layer of one or more output nodes, and, in hidden-layer networks, one or more so-called hidden layers, each comprised of one or more nodes. Hidden layers are hidden in the sense that they do not connect directly to any inputs or outputs.

The knowledge in a neural net is contained in its weights. Each node in the input layer or hidden layer contains a weight associated with its connection with each node in the next layer. Thus, in a typical hidden-layer network, each node in the input layer has a separate weight for its connection to each node in the hidden layer, and each node in the hidden layer has a separate weight for its connection to each node in the output layer. The value supplied to each given node in a given layer is supplied to each individual node in the successive layer, multiplied by the weight representing the connection between the given node and the individual node in the successive layer. Each node receiving such values generates an output, which is a function of the sum of the values supplied it. Usually the output is a non-linear function of the sum of values supplied to the node, such as a sigmoid function. The sigmoid function has the effect of making the output operate like an on-off switch whose output varies rapidly from a substantially "off" value to a substantially "on" value as the sum of the values supplied to the node crosses a small threshold region.

A common way for training the weights of a neural network is to take each record in a training set and apply the value of each of its source fields to a corresponding input of the net. The network's weights are then modified to decrease the difference between the resulting values generated at the network's one or more outputs and the actual values for the outputs' corresponding target fields in the record. There are a variety of well know methods for making such weight modifications, including backprogation, conjugate gradient, and quick propagation. The training process is normally repeated multiple times for all the training records until the sum of the difference between the generated and actual outputs approaches a relative minimum.

One of the problems with neural nets is that the amount of time to appropriately train them to recognize all of the possible source field patterns associated with desired target field values goes up very rapidly as the number of source or target fields does, and as the number of different types of source patterns which might be associated with a desired target does. Even with large parallel computer systems the amount of time required to properly train such networks to learn such complex sets of patterns is often prohibitive.

In an attempt to improve the speed at which neural networks can train, a new type of neural network has been proposed. These are so called neural tree networks. These are decision trees, a well known type of classifying tool, in which a neural network is placed at each of the network's non-terminal nodes. In such trees, each non-terminal node is a two layer network, which trains much more rapidly than a hidden-layer network. The data applied to each non-terminal node is used to train up the node's neural net. This is done in a training process which applies the source fields used in the overall classification process to the input nodes of the net and the one or more target fields used in that classification process to the output of the two layer net. Once the network has been trained over the training set, the data objects are split between the node's child nodes based on whether the one or more sigmoidal output of the trained net is "on" or "off" for each such data object. The data object reaching the tree's terminal, or leaf, nodes are considered classified by the identity of the particular leaf node they reached.

Such neural tree networks have the advantage of training much more rapidly than traditional neural networks, particularly when dealing with large complex classification tasks. However, they are not as discriminating as might be desired.

In general, a major issue in parallel computing is the division of the computational task so that a reasonable percentage of the computing power of multiple processor can be taken advantage of and so the analytical power of the process is as high as possible. This issue is particularly important when it comes to many data base mining functions, such the training of neural networks mentioned above or of other modeling tasks.

SUMMARY OF THE INVENTION

It is an object of the present invention to provide apparatuses and methods for more efficiently computing large amounts of data.

It is another object of the present invention to provide apparatuses and methods for efficiently finding patterns in data sets, particularly large data sets.

It is still another object of the present invention to provide apparatuses and methods for efficiently using and training neural networks to find patterns in data set.

It is yet another object of the present invention to provide apparatuses and methods for more efficient parallel computing.

According to one aspect of the present invention a computer system with P processors receives data objects having N parameters. It divides an N-dimensional data space defined by the N parameters into M sub-spaces, where M is greater than or equal to P. This is done in such a manner that the boundaries between the resulting sub-spaces need not be orthogonal to the N-dimensions. The system associates a different set of one or more sub-spaces with each of the P processors. It distributes data objects located in each sub-space to the sub-space's associated processor and causes each processor to perform a computational process on each of the data objects distributed to it.

According to another aspect of the invention, a computer system with P processors receives a set of data objects to be processed. A decision tree partitions the data set into at least M data sub-sets, where M is equal or greater than P. A different set of one or more of the sub-sets is associated with each processor, and the data objects in each sub-set are sent to the associated processor for processing. In some embodiments, the process of using a decision tree to partition the data set is performed on fewer than P processors. In many embodiments, the decision criteria of the non-terminal nodes of the decision tree are trained on the data set, in a process where each non-terminal node both trains on and then divides between its children the data supplied to it.

In some embodiments, the non-terminal nodes are neural nets having hidden layers. In some embodiments, the decision criteria of the non-terminal nets can be automatically set to achieve a desired ratio between the number of data objects sent to each of such node's child nodes. In some such embodiments, the system automatically configures the decision tree to have a number of leaf nodes which is an integer multiple of the number P of processors.

According to another aspect of the invention, a computer system divides an N-dimensional data space, having a separate dimension for each of N parameters associated with the data set, into M sub-spaces. It associates each of these M sub-spaces with a corresponding one of M hidden-layer neural networks, and uses the data objects in each of the M sub-spaces to train that sub-space's associated hidden-layer neural network. The resulting divisions need not be orthogonal to the N dimensions of the space.

According to another aspect of the invention, a computer system creates a decision tree having a neural network for each of its nodes, including a hidden-layer network for each of its terminal, or leaf, nodes. Each of the tree's non-terminal nodes use the portion of the training data which is supplied to it to train its associated neural network and then uses that neural network, once trained, to determining which of the training data object supplied to it should be supplied to each of its child nodes. In one embodiment, the net in each non-terminal node is trained to divide an N-dimensional space defined by parameters from the training data set into sub-spaces, and the data objects associated with each sub-space are routed to a different one of that non-terminal node's child nodes. In such an embodiment, each non-terminal node can be a two layer neural network which defines a single vector of weights in the N-dimensional space, and the data space is split by a plane perpendicular to that vector.

The portion of the training set supplied by the decision tree to each of its terminal, or leaf, nodes is used to train that node's corresponding neural network. In preferred embodiments, different leaf node networks are trained on different processors. In many embodiments, a copy of the entire decision tree, including the neural networks in both its non-terminal and leaf nodes, is stored on each of a plurality of processors. Then a set of new data objects is split into separate data partitions, one for each of such processor. Finally data objects from the partition associated with each processor are passed down through the copy of the complete decision tree stored on that processor. This causes each such data object to be routed to a given leaf node of the tree, at which point the hidden-layer neural network associated with the given leaf node will analyze the data object, such as by classifying it, or recording an estimated value for each of its target fields.

According to another aspect of the invention, a neural tree net has hidden-layer neural networks in it non-terminal nodes.

According to another aspect of the invention, a computer system includes a neural network, such as one in the nodes of one of the above mentioned decision trees, which automatically causes a selected percent of data objects applied to the neural network to be selected for a given purpose.

DESCRIPTION OF THE DRAWINGS

These and other aspects of the present invention will become more evident upon reading the following description of the preferred embodiment in conjunction with the accompanying drawings, in which:

FIG. 3 illustrates BuildModel_Master, a simplified pseudo-code representation of the process run on one processor to train the non-terminal nodes of the neural tree network as part of the training process shown in FIG. 2;

FIG. 13 illustrates BuildModel_Slave, a simplified pseudo-code representation of the process run on each of a plurality of processors to train the hidden-layer neural networks associated with the leaf nodes of the neural tree network shown in FIG. 2;

FIG. 16 illustrates ApplyModel_Master, a simplified pseudo-code representation of the process run on a single processor to control the ApplyModel process shown schematically in FIG. 14;

FIG. 17 illustrates ApplyModel_Slave, a simplified pseudo-code representation of the process run on each of a plurality of separate processor nodes in the ApplyModel process shown in FIGS. 14 and 15;

DETAILED DESCRIPTION OF PREFERRED EMBODIMENTS

Figure 1:
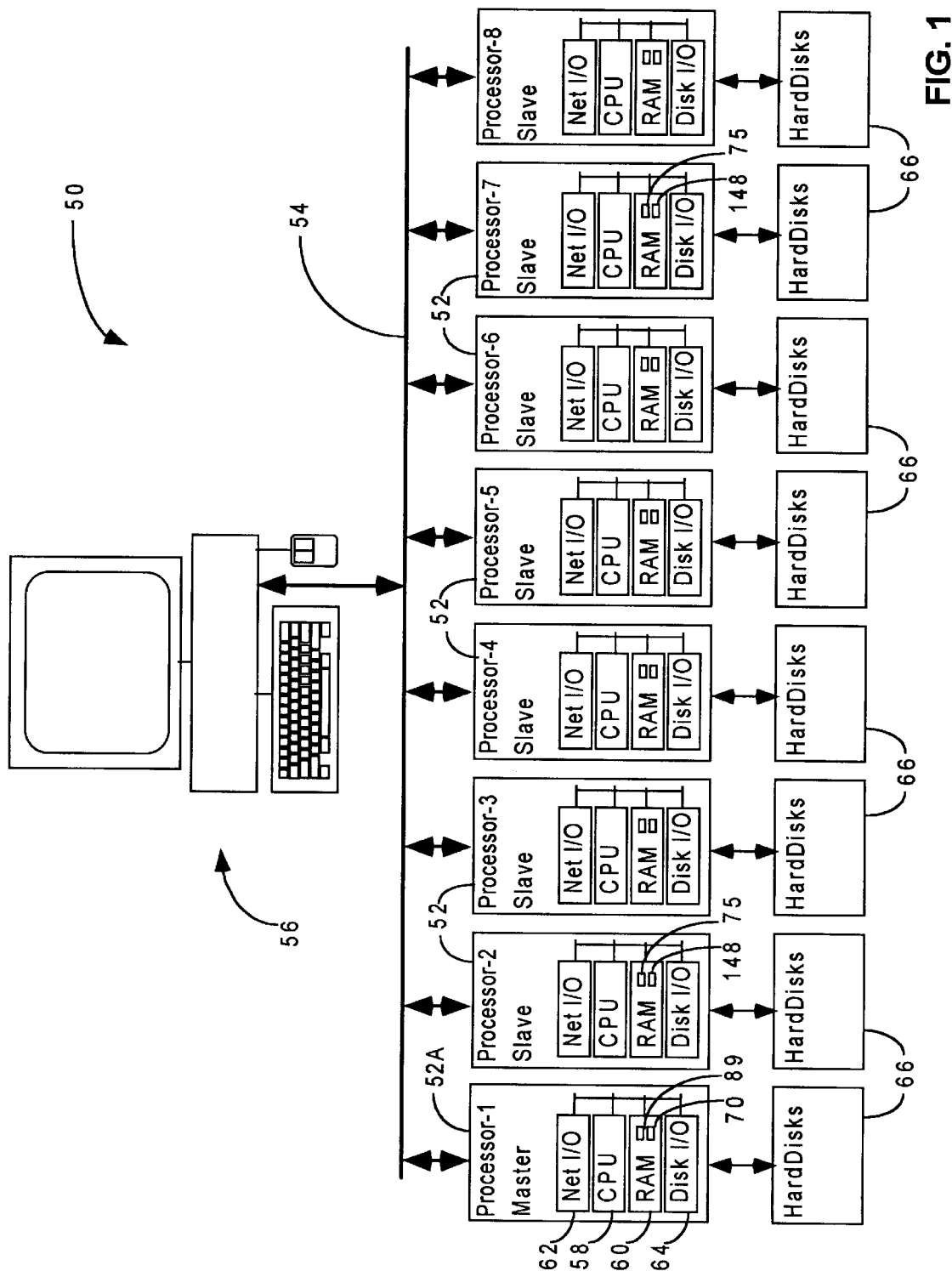
FIG. 1 is a schematic representation of one type of parallel computing system which can be used with the present invention.

FIG. 1 shows one type of parallel computer system 50 which can be used to create an embodiment of the present invention. In this system, each of eight processors 52 are connected together through a high speed computer network 54. Also connected to this computer network is a workstation 56 which enables a user to control the system and to receive selective output from it. Each processor 52 includes a central processing unit, or CPU, 58, which executes instructions stored in, and reads and writes data from and to, the random access memory, or RAM 60. A network interface 62 performs the function of reading and writing data over the network between processors. A disk interface 64 enables each processor to read and write data to one or more hard disks 66 connected to each processor.

The computer programs and data structures described in the following application are stored in one or more of the random access memories 60 or hard disks 66, and are executed or manipulated by one or more of the processors' CPUs. For example, in FIG. 1 the BuildModel_Master program code 89 and the neural tree network data structure 70 are shown stored in the RAM 60 of the master processor 52A, and BuildModel_Slave process 148 and the leaf node neural network 75 are showed stored in the RAM of each slave processor 52. When such programs and data structures are stored in RAM or hard disk memory and are processed by CPUs they convert the computing system 50 into a system for performing the present invention's functions.

In FIG. 1, one of the processor nodes 52A is labeled a "master". The other of the processor nodes are labeled "slave". In the parallel processing scheme used in a preferred embodiment of the invention, certain computational processes are best performed on one machine. Also there is a benefit in having one machine tell the others what to do. This one machine is called the Master, since it controls the operation of other, slave, processors. In the embodiment shown in the figures, the master runs on a different machine than any of the slaves. In other embodiments, a single processor can act as both a master and a slave.

Figure 2:
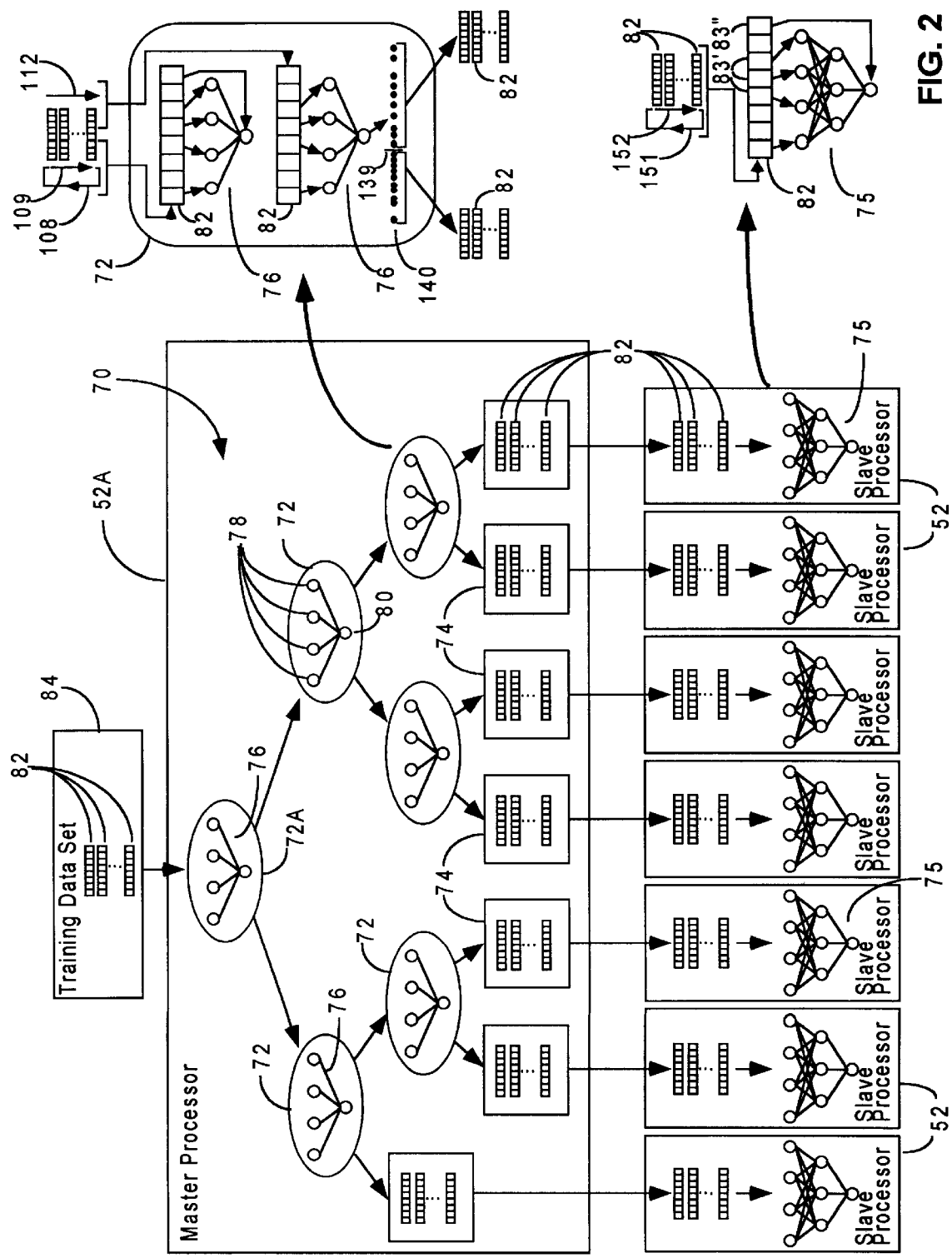
FIG. 2 is a schematic representation of the BuildModel process for training a neural tree network which embodies the present invention.

FIG. 2 illustrates BuildModel, a process of training a neural tree network 70 used in one embodiment of the present invention. The tree network 70 contains a plurality of non-terminal nodes 72 and terminal, or leaf, nodes, each of which is represented by a bin for data records 74 and a hidden-layer neural network 75. Each non-terminal node contains a two layer neural network 76. Each such two layer network, itself, contains a layer of input nodes 78 and one output node 80.

The non-terminal nodes of the tree are trained, and records 82 of a training data set 84 are divided into leaf node bins 74 on the master processor 52A. The training records routed to each terminal, or leaf, node by the non-terminal nodes of the tree are then used to train the hidden-layer neural network associated with that leaf node. This training process is performed on one of the slave processors 52.

FIG. 3 illustrates BuildModel_Master, a highly simplified pseudo-code representation of the process which is run on the master to build and train the tree's non-terminal nodes and to select which records should be associated with each of the leaf node bins 74.

In this simplified description, BuildModel_Master starts with steps 90–96 which create the basic tree topology of the neural network decision tree 70. Step 90 creates the largest balanced binary tree topology which has a number of temporary leaf nodes fitting within NoOfEndNets, the desired number of leaf nodes specified by a user. This balanced tree will have a number of leaf nodes corresponding to the largest full power of two which fits within NoOfEndNets. In the example shown in FIG. 2, NoOfEndNets has been set to seven, so there will be a separate leaf node for each of the seven slave processors 52 shown in that figure. In this example, step 90 will create a tree having the top three non-terminal nodes 72 shown in FIG. 2, starting with the root node 72A. At this point the incomplete tree topology will have room for four temporary leaf nodes, since four is the largest power of two fitting within seven.

Next step 92 adds non-terminal nodes to the bottom level of the nascent tree until there are NoOfEndNets leaf nodes. In the example of FIG. 2, the bottom most three non-terminal nodes 72 are added in this step. This causes the total number of leaf nodes 74 to equal seven, the desired number indicated by the user.

Next step 94 associates a RecordRatio value equal to one divided by NoOfEndNets with each leaf node 74. In our example this causes a number of ⅐ to be associated with each leaf node 74. This is done as part of an effort to ensure that each leaf node 74 will have a substantially equal number of records supplied to it in the training process. Then step 96 goes up the tree one level at a time, associating a RecordRatio value with each non-terminal node equal to the sum of the RecordRatios of that node's two child nodes. Once this is done, each non-terminal node will know what percent of the records supplied to it are to be supplied to each of its two child nodes, based on the ratio of the RecordRatio values of those two child nodes.

Next a step 98 supplies all the records 82 of the training set 84 to the root non-terminal node 72A of the tree. Once this is done, a step 100 performs a loop for each horizontal level of the tree. This is the basic loop in the training process, and once it has been completed for all such levels, all of the tree's non-terminal nodes will have been trained and all of the training records will have been routed to one of the leaf node bins 74.

For each horizontal level of the tree containing non-terminal nodes, loop 100 performs a sub-loop for each non-terminal node in that level. Each such loop consists of steps 104–120.

Step 104 selects from the N parameters of the training records used in the non-terminal node networks, the ParameterOfGreatestSpread, that is, that one of the N parameters over which the training records supplied to the current node have the greatest spread. The N parameters used for such purposes will normally comprise all of the I source fields to be used in training the leaf node hidden-layer neural networks 75, and perhaps also the J one or more target fields to be used on that training. For purposes of step 104, spread is best measured by a statistical measurement of spread, such as standard deviation.

Figure 4:
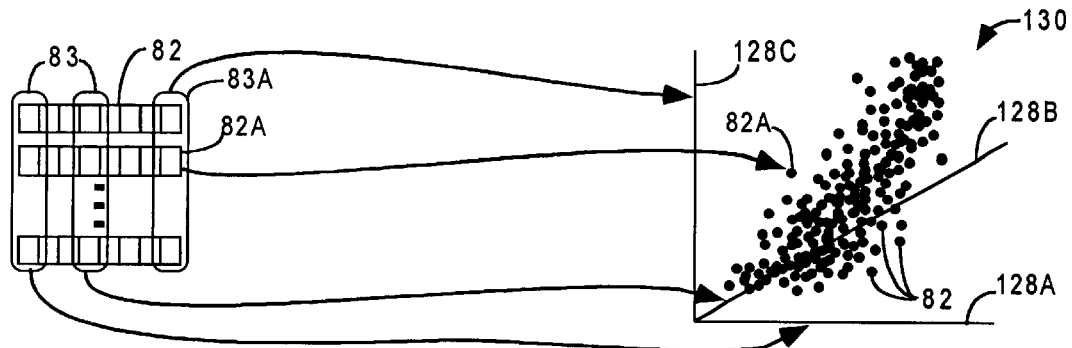
FIG. 4 is a schematic representation of a data space defined by a portion of a training data set supplied to a non-terminal node of the neural tree network shown in FIG. 2, and of the selection of a parameter whose values have the greatest spread in that portion of the data set.

FIG. 4 illustrates three dimensions 128A–128C of the N-dimensional space 130 defined by the N parameters 83 used in training the non-terminal nodes. The set of N parameters used by the non-terminal nodes can include parameters integer and binary values, as well as real number values. FIG. 4 shows the records 82 of the training set as data points in that N-dimensional space. In this example shown in FIG. 4 the parameter 83A, that corresponding to the vertical axis 128C, has the greatest spread of values.

Once Step 104 has selected the ParameterOfGreatestSpread for the current node, step 106 creates a two layer neural network for it, with a separate input node for each of the remaining N parameters to be used in training the non-terminal nodes and one output node.

Then a step 108 repeatedly performs a training loop 109 until the node's network appears to have been properly trained.

Figures 5, 6:
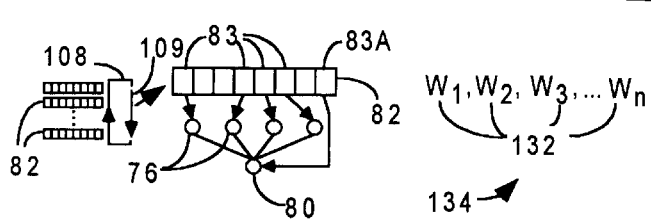
FIG. 5 is a schematic representation of the process of training a non-terminal node in the tree of FIG. 2.
FIG. 6 is a schematic representation of the vector of weights defined by the training process of FIG. 5.

FIG. 5 provides a schematic representation of the training process. Each iteration of the training loop 109 performs a step 110 for each training record 82 supplied to the current node. This step supplies the values in each of the current training records N parameters 83 to a corresponding input 76 of the non-terminal node's neural net. It also supplies the ParameterOfGreatestSpread 83A to the network's output 80. It compares the generated value produced at the output node in response the values supplied to the inputs 76 to the value supplied to the output by the training record. It then modifies the weight 132 associated with each input 76 so as to reduce that difference, by using one of the well known schemes for training the weights of neural networks. FIG. 6 illustrates the set of weights W associated with each of the inputs 76 as a vector 134, having the form $W_1, W_2, W_3, \ldots W_N$.

Normally the loop 108 stops training when either a certain number of training loops have been exceeded or when the reduction, between successive training loops, in the sum, taken over each training cycle 109, of the differences between generated and training record values for the output 80 drops below a given level.

Figure 7:
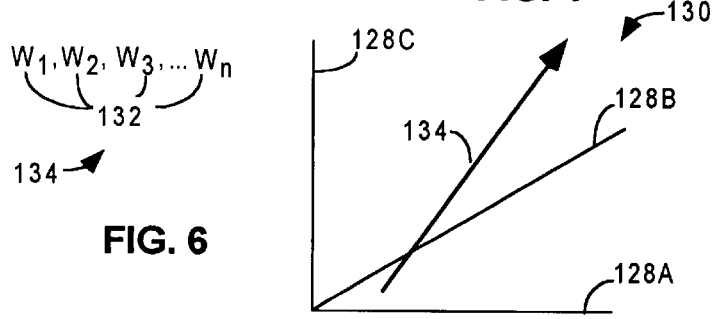
FIG. 7 is a schematic representation of the vector of FIG. 6 shown in the spatial coordinates of FIG. 4.

FIG. 7 illustrates that once the current non-terminal node's neural network has been trained by multiple iterations of the loop 108, the vector 134 defined by the net's weights will have a direction generally corresponding to the direction of greatest spread of the distribution of records 82 in the N-dimensional space 130. It should be noted that this vector will not be parallel to any parameter axis of the N-dimensional space, except in the unusual case in which the axis of maximum spread of the node's training data is also parallel to such an axis.

Once the current non-terminal node's network has been trained, a loop 112, comprised of sub-steps 114 and 116, is performed for each record in the node's training data.

Figure 8:
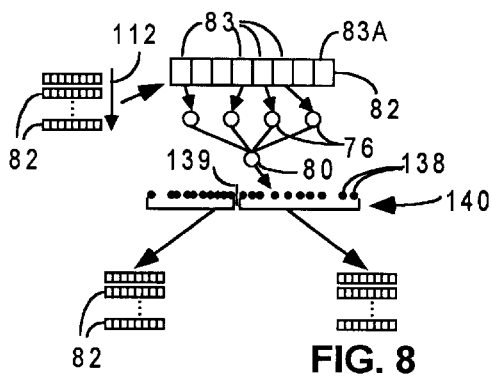
FIG. 8 is a schematic representation of the process of using the neural net of a non-terminal node of the tree shown in FIG. 2 to split the training data object supplied to it between that node's two child nodes.

FIG. 8 schematically represents the loop 112 and the functions of its sub-steps. For each of the records 82, step 114 applies the record's N parameters 83 to the inputs 76 of the node's network and step 116 uses the resulting value 138 produced at the net's output as a score. It indexes the current record in a ScoreList 140, ordered by such scores.

Figure 9:
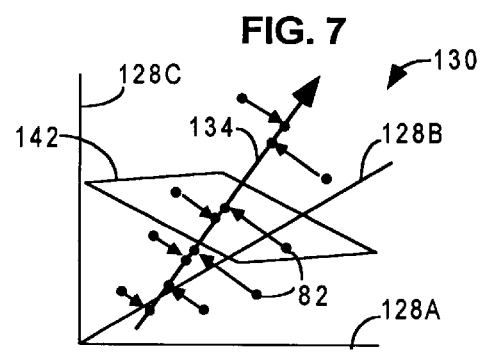
FIG. 9 is a schematic representation of the decision process shown in FIG. 8 represented in the spatial coordinates of FIGS. 4 and 7.

For purposes of step 114, the value of the output node 80 is just the sum of each input times its associated weight. There is no need to put that sum through the sigmoid function. As a result, each score 138 corresponds to perpendicular projection of each data point 82 onto the vector 134, as shown in FIG. 9.

Once all the records have been ordered, based on their outputs, step 118 selects a SplitPoint 139 in the ScoreList 130 having the same ratio of records scored above and below it as the ratio between the RecordRatio's of the current non-terminal node's two child nodes. Moving this SplitPoint up and down the ScoreList corresponds to translating a plane of split 142, perpendicular to the vector 134, in a direction parallel to that vector. As indicated schematically in FIG. 10, once a SplitPoint is selected, the corresponding plane of split 142 will divide the distribution of data records supplied to the node. It will do so in a manner that associates a desired ratio of training records with each of the non-terminal node's two child nodes.

Once step 118 has split the current node's training records, step 102 sends the training records on each side of the SplitPoint to a respective one of the current node's two child nodes.

Figures 10, 11, 12:
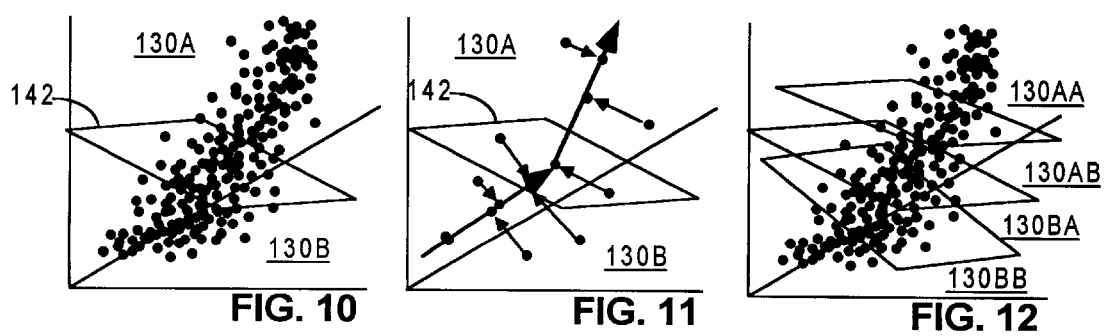
FIG. 10 is a schematic representation of the data space and data points of FIG. 4, as split by the process of FIGS. 8 and 9 into two sub-spaces.
FIG. 11 is a schematic representation of the data space of FIG. 10, indicating that the processes of FIGS. 5–9 are separately applied to each of sub-spaces shown in FIG. 10.
FIG. 12 is a schematic representation of the space of data points of FIG. 10, with each of the two sub-spaces shown in FIG. 10 having been sub-divided into two sub-sub-spaces.

It can be seen that each iteration of the loop 100 will cause the non-terminal nodes to split the data space 130 of the training records supplied to it into subspaces 130A and 130B, as shown schematically in FIG. 10. As indicated in FIG. 11, in the next iteration of loop 100, the process of finding the vector of maximum spread shown in FIGS. 5–7 and projecting all of the data in a given portion of the data space onto that vector will be repeated for each such subspace 130A and 130B. As indicated in FIG. 12, this will result in the sub-space 130A being divided into sub-subspaces 130AA and 130AB, and the sub-space 130B being divided into the sub-sub-spaces 130BA and 130BB. This process of division and sub-division will be repeated in each horizontal layer of leaf nodes until the data space has been divided into a number of sub-space regions equal to to the number of the tree's leaf nodes. Not only that, but when the process is completed each leaf node bin 74 will end up having approximately the same number of records.

Returning now to FIG. 3, once the loop 100 has been completed for all of the tree's non-terminal nodes, the neural network's associated with all of the tree's non-terminal nodes will have been trained up and all of the training records will have been distributed to the leaf node bin's 74. At this point step 122 creates a compressed representation of the tree network. In this representation, each non-terminal node's neural net is represented by its weight vector 134 and its SplitPoint 139.

Once this is done, a loop 124 performs a step 126 for each leaf node 74 in the tree. Step 126 distributes the set of training records 82 routed to each such leaf node bin 74 to a successive one of the slave processors 52 shown in FIG. 2. This can be done in a cyclical, or round robin manner, so that if there are more leaf nodes than slave processors, once all the slave processors have received the set of training records for a first leaf node, step 126 will start successively distributing a second set of leaf node records to the slave processors, and so on. This is done to attempt to distribute the computation of training leaf node neural nets relatively evenly among the processors. It can be seen that the non-terminal nodes of the neural tree network function to partition the data used by the slave processors in training the hidden-layer neural nets 75.

Once the record set associated with each leaf node has been distributed by the master processor to an associated slave processor, step 128 of BuildModel_Master causes each of the slave processors to execute BuildModel_Slave, the slave process for using the set of training records associated with each leaf node to train that node's associated hidden-layer neural network.

Once the master instructs the Slaves to train the leaf node neural networks, it waits in step 130 for each such slave to send back a compressed representation of the neural networks it has trained. The master then attaches each such compressed leaf node network to the place corresponding to its leaf node in the compressed tree representation formed by step 122. Once this has been done for all of the leaf nodes, a compressed representation of the fill, trained neural tree network will have been completed. Once step 131 has stored this complete tree network on hard disk, the BuildModel_Master process will be complete, and will stop execution.

FIG. 13 illustrates BuildModel_Slave 148, a highly simplified pseudo-code representation of the process which is run on each of the Slave processor's to train the tree's leaf node neural networks. A separate instance of this process is run for each leaf node which has been associated with a given slave processor.

Each instance of BuildModel_Slave starts with step 150, which creates a hidden-layer neural network 75, indicated schematically in FIG. 2, for its associated leaf node. This network has an input for each of I source fields, and an output for each of J target fields, where the integer values I and J have been previously specified by a user of the system, and where at least the I fields are included in the N parameters used to train the non-terminal nodes. The neural network will also include a hidden layer which contain a number of nodes specified by the user.

Once the leaf node's neural network has been created, a loop 151 causes a training loop 152 to be repeated until the percentage change in the sum of the differences between generated and actual outputs between training loops is below a given level. The expanded view of the leaf node net shown in the lower right hand corner of FIG. 2 schematically represents this training process. In each iteration of the training loop 152, a step 154 uses each record in the leaf node's training set to train the leaf node's neural network. As indicated in FIG. 2, during training each record has each of its I source field 83' connected to a corresponding one of the network's inputs and each of its J target fields 83" connected to a corresponding one of the network's outputs. The difference between the value generated at the network's J outputs and the training record's values for the corresponding J target fields is used to train the network's weights, such as by backpropagation or any other method for training hidden-layer neural networks.

Once loop 151 has determined that the neural network has undergone enough training loops to be properly trained, step 156 creates a compressed representation of the leaf node's neural net. This compressed representation consists of a matrix for the input layer having a row for each hidden-layer node and a column for each input layer node. Each entry in the matrix contains the weight value of the connection between its corresponding input and hidden-layer nodes. The compressed representation also includes a corresponding matrix having a row for each output node and a column for each hidden-layer node. Where there is only one output node, this matrix will reduce to a vector.

Once a compressed representation has been made for the leaf node's trained hidden-layer neural network, that compressed representation is sent back to the master processor so that it can be put into its proper place on the complete neural tree network, as described above with regard to step 130 of FIG. 3. Once this has been done BuildModel_Slave is complete and its execution terminates.

Turning now to FIGS. 14–19, the ApplyModel process will be described.

Figure 14:
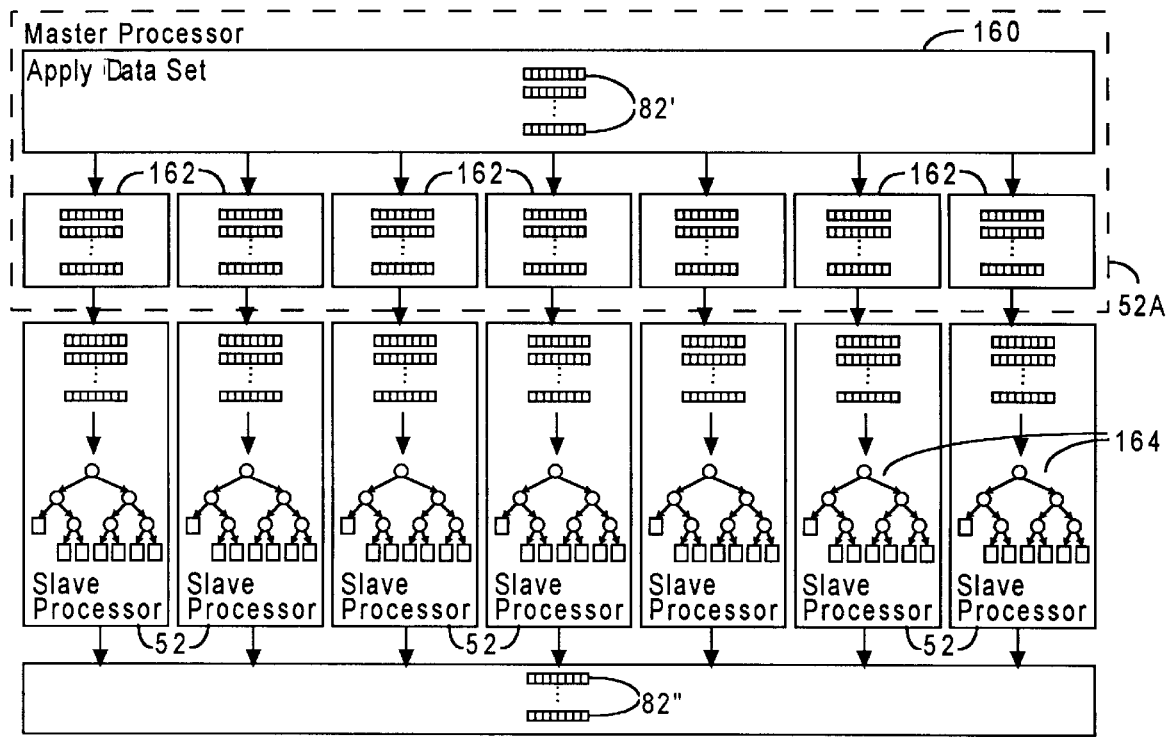
FIG. 14 is a schematic representation of the ApplyModel process in which a large Apply data set is partitioned, and each separate partition is run through a copy of the neural tree network trained in FIG. 2 on a separate processor.

FIG. 14 is a schematic graphical representation of the overall ApplyModel process. In this process, a large apply data set 160 is split into sub-sets, or partitions, 162, if it is not already so partitioned. Each such partition is supplied to a separate slave processor 52, and each data record in that partition is passed through a copy of the compressed neural tree net 164 created by the BuildModel process which is stored on that processor.

The records 82' of the apply data set will normally include all of the N parameters used as inputs to neural nets of the non-terminal nodes. In some instances they might not yet have any values for the J target fields of the leaf node neural networks, since, in many instances, it is the purpose of the neural tree network to predict the values in those fields before actual values for those fields have been determined. Often the apply data base is huge, containing many millions of records.

FIG. 16 illustrates ApplyModel_Master 170, a simplified pseudo-code representation of the process run on the master processor 52A to control the ApplyModel process shown schematically in FIG. 14. In this simplified illustration this process is shown including steps 172–178.

Step 172 tests to see if the apply data set has already been partitioned, and, if not, it partitions it. Since each slave processor will have an identical copy of the compressed neural tree network 164, it makes no difference into which processor's partition a particular record is sent. Thus, any partitioning scheme, such as a simple round-robin scheme, which distributes records between partitions in a roughly equally manner, and which executes relatively quickly, will work well for this purpose.

In the embodiment of the invention described, the ApplyModel process is one of a set of modular computing processes 180 which can be run on a parallel computer. If the ApplyModel process 180A is being run without any preceding modular process, as shown schematically in FIG. 18, or with an immediately preceding modular process which does not produce a separate partition for each of the processors to be used in the ApplyModel process, the partitioning process 182 which is part of the module 180A will have to partition the apply data base, as indicated in step 172.

Figure 19:
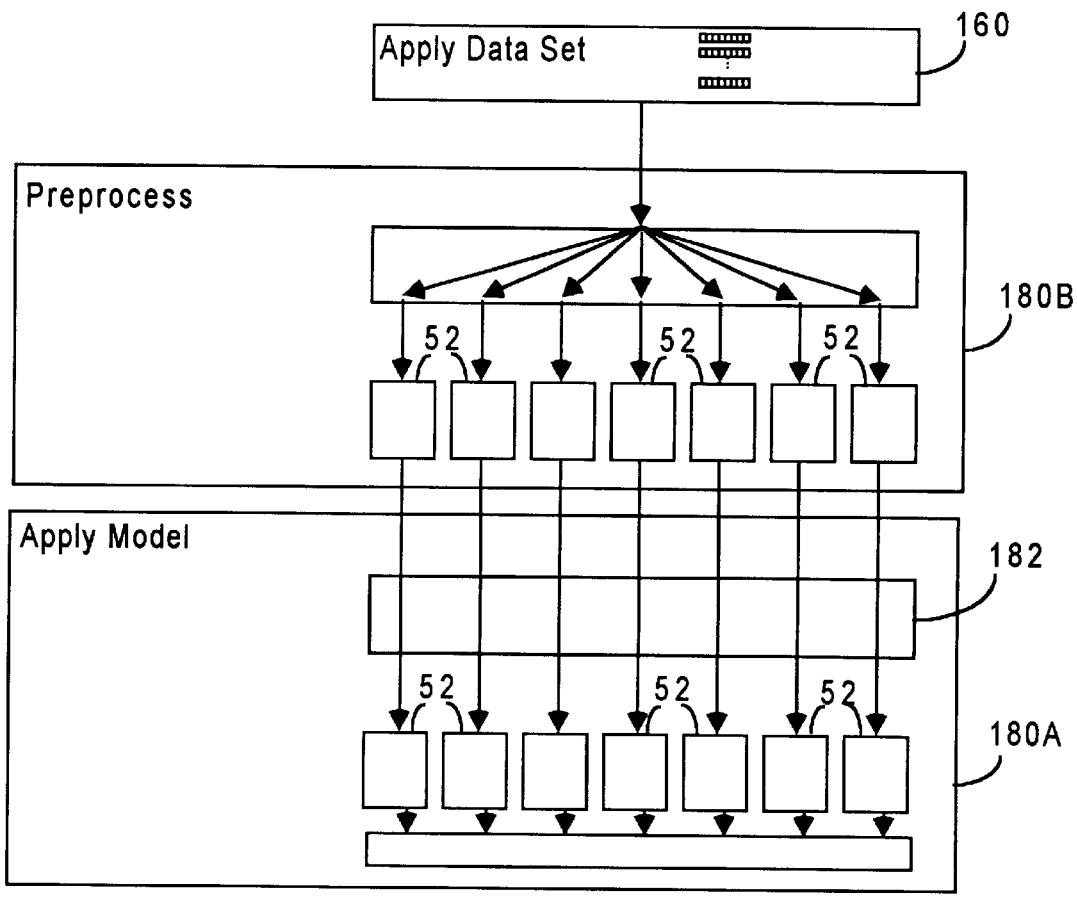
FIG. 19 is a schematic representation of the ApplyModel process when it is used in conjunction with another computational process which supplies it with data that is already partitioned.

If, on the other hand, the ApplyModel process is being performed immediately after a process which has already partitioned the apply data set, then the partitioning process 182 will merely pass through the previously made partitions. An example of this is represented in FIG. 19, in which the ApplyModel process is shown following a preprocessing process 180B, which is used to remove duplicate records and to reduce the number of fields in each record to those necessary for the ApplyModel process.

Returning now to FIG. 16, once step 172 has ensured the apply data set is partitioned, step 174 distributes a copy of the compressed complete neural tree network 164 to each slave processor node. Then step 176 causes each processor to run the ApplyModel_Slave process 190 on its associated data partition. Then step 178 receives all of the records selected by all of the leaf node neural networks running on all of the slave processors, and reports them to the user's workstation 56 shown in FIG. 1. Once this is done the ApplyModel_Master process is complete, and it terminates execution.

Figure 15:
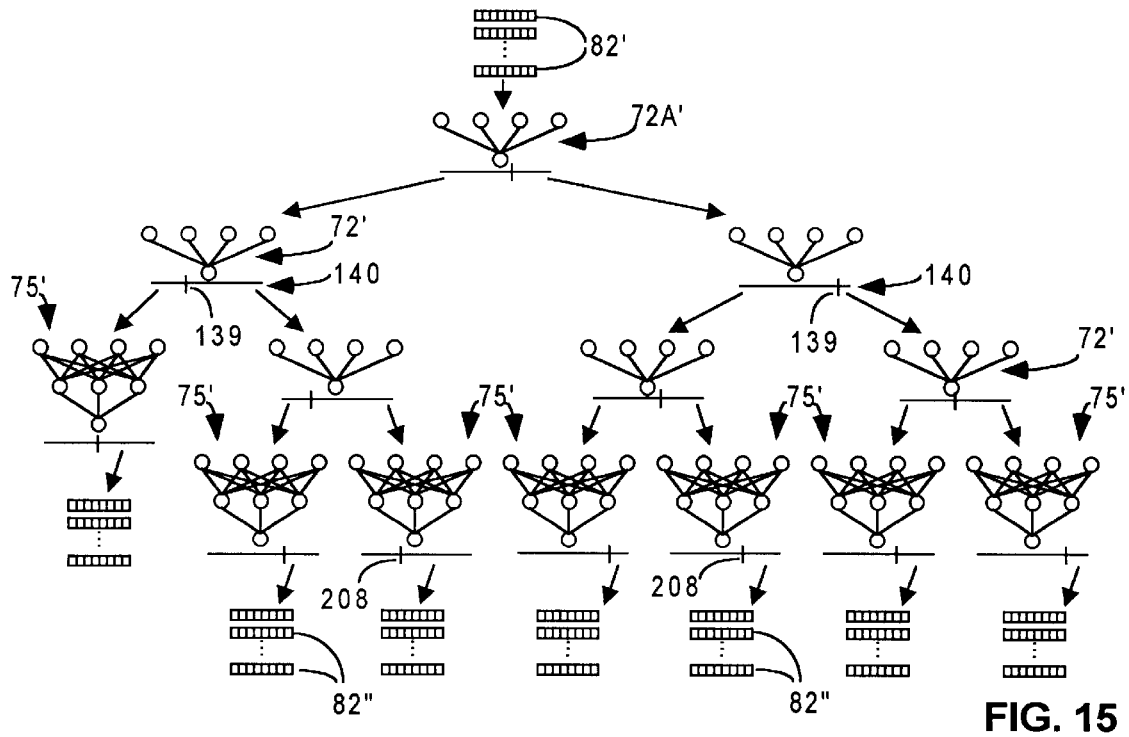
FIG. 15 is a schematic representation of the copy of the neural tree network contained in each processor in FIG. 14, and of the data records passing through that tree.

FIG. 17 provides a highly simplified pseudo-code illustration of the ApplyModel_Slave process 190. FIG. 15 illustrates this process graphically.

Loop 192 of ApplyModel_Slave is performed for each record 82' in the data partition supplied to the individual processor on which ApplyModel_Slave is running. This loop causes each record to be appropriately routed down through the compressed neural tree 164. It starts with a step 194 which makes the root node 72A' the initial CurrentNode for the current record. Then a loop 196, comprised of steps 198 and 200, is repeated until the record's Current node is no longer a non-terminal node. Step 198 applies each of the current record's N parameter values to the corresponding inputs of the node's two layer neural network. Then, depending on whether or not the output of the neural network, as determined by multiplying the vector formed by the input fields of the current record by the node's associated weight vector, is above or below the node's SplitPoint 139, step 200 selects one of the CurrentNode's two child nodes as the new CurrentNode. Thus, the loop 196 routes a given record from the root node all the way down to that one of the tree's leaf nodes 75' corresponding to its associated portion of the N-dimensional space defined in the BuildModel training process.

Once the current record has reached a given leaf node, step 202 applies the record's I source fields, to the inputs of the leaf node's hidden-layer neural network. Then step 204 classifies the record depending upon the output of that neural network, normally treating the record as a selected record 82" if the leaf node network's output for it is above a threshold value 208, and discarding the record if it is not. In other embodiments of the invention the estimated values produced at the outputs of a leaf node's neural network for each record are recorded in that record's target fields, and saved as part of the record for later use. Such later use can include statistical or data base analysis of the estimated fields of the apply data set.

Once the loop 192 has routed each record to the appropriate leaf node net and caused that leaf node net to classify the record, step 206 sends the results of the classification to the master processor, and execution of ApplyModel_Slave terminates.

The neural tree network produced by the above method has the advantage of performing better analysis for a given level of computation than prior neural networks or prior neural tree networks. By dividing the N-dimensional data space into sub-spaces and using each such sub-space to train a separate end-node hidden-layer neural network, the distribution of training samples fed to each such end net are much more similar. This results in three advantages: 1) it takes fewer hidden-layer nodes to accurately model the data supplied to each network; 2) it takes fewer training cycles to train each hidden-layer networks; and 3) each training cycle has fewer training records. Each of these three factors alone results in computational savings. Their combination results in a much greater one.

Figure 20:
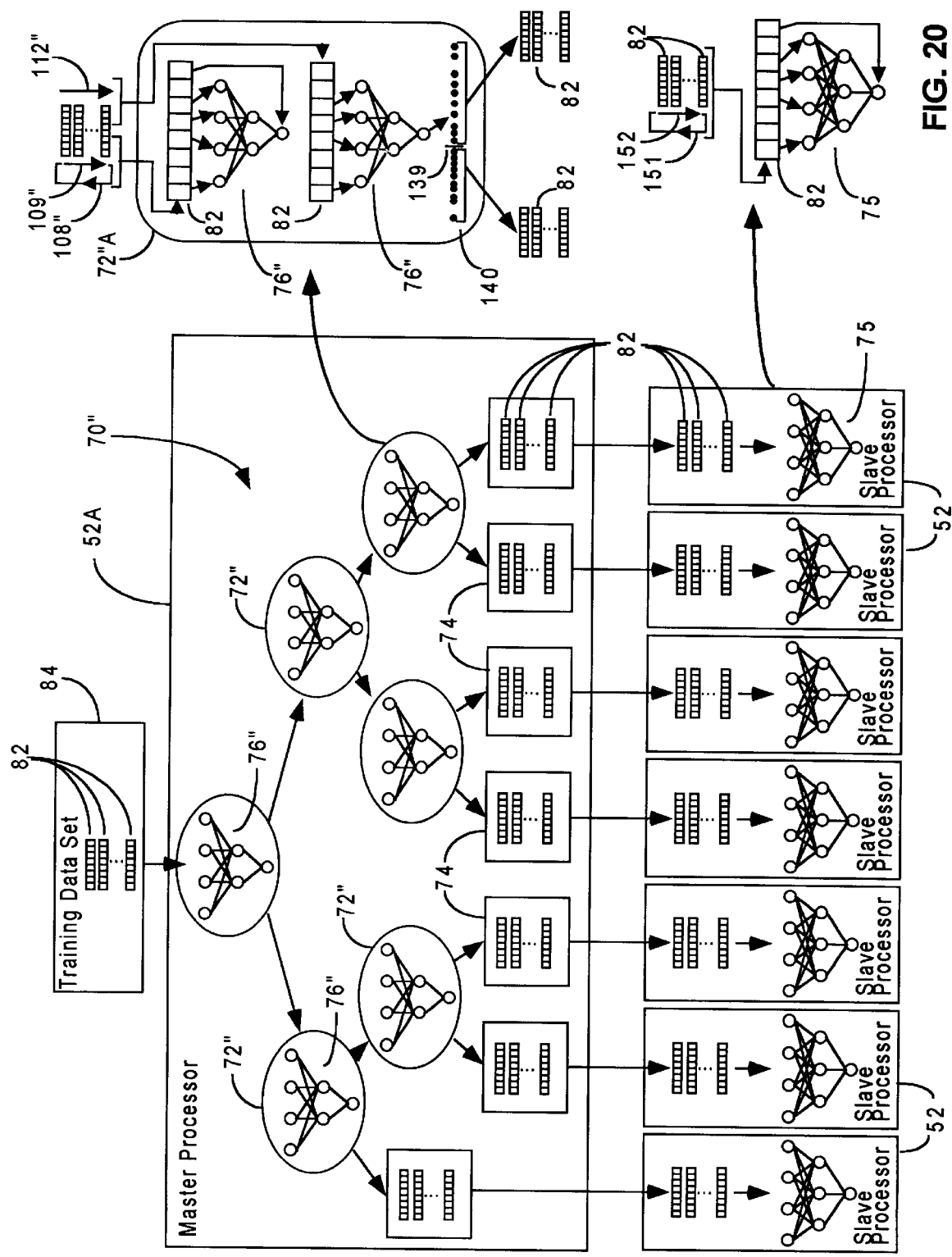
FIG. 20 illustrates an alternate embodiment of the ApplyModel process in which the neural tree network includes hidden-layer networks in its non-terminal nodes.

FIG. 20 illustrates another embodiment of invention which is similar to that described above with regard to FIGS. 1–19, except that the non-terminal nodes 72" of its neural tree network 70" contain hidden-layer neural networks 76", instead of two layer networks 76 shown in FIG. 2.

As is indicated in the expanded view of the non-terminal node 72" shown in the right upper corner of FIG. 20, the training of such non-terminal nets in the embodiment of FIG. 20 is very similar to that used in the embodiment of FIG. 2. During the training loop 108" and 109", which corresponds to the training loop 108 and 109 shown in FIGS. 2 and 3, the hidden-layer net is trained in the same manner as stated in step 110 of FIG. 3, that is, by applying each of the N parameters of each training record to the net's inputs and supplying the ParameterOfGreatestSpread to the net's output and using a training algorithm to modify the net's weights to reduce the difference. The only difference is that the application of the training algorithm has to update more weights, since there is a hidden layer.

The selection of which records are sent to each child node of a given non-terminal node 72" is basically the same as that described above with regard to steps 112–120 of FIG. 3. The training records to be supplied to the non-terminal node are ordered on a ScoreList 140 in terms of their corresponding outputs on the neural net once it has been trained. A SplitPoint 139 is chosen on the ScoreList such that there is a desired ratio of records above and below it. And the records above the SplitPoint are sent to one child node and those below it are sent to the other.

The use of such hidden-layer neural networks has the effect of recursively splitting the N-dimensional space defined by the records of the training set into sub-spaces, as does the embodiment of the invention using two layer nets. The difference is that the boundaries of the sub-spaces created with hidden-layer nets in the non-terminal tree nodes of FIG. 20 are curved in N-dimensional space, allowing for a division of records between leaf nodes which is more likely to group together into a common leaf node records which are similar for purposes of the analysis task. This further improves the accuracy of the neural tree network's analysis.

It should be understood that the foregoing description and drawings are given merely to explain and illustrate the invention and that the invention is not limited thereto, except insofar as the interpretation of the appended claims are so limited. Those skilled in the art who have the disclosure before them will be able to make modifications and variations therein without departing from the scope of the invention.

For example, the functions or devices for performing them, described in the claims below can be realized by many different programming and data structures, and by using different organization and sequencing. This is because programming is an extremely flexible art form in which a given idea of any complexity, once understood by those skilled in the art, can be manifested in a virtually unlimited number of ways.

Furthermore, it should be understood that the invention of the present application, as broadly claimed, is not limited to use with any one type of operating system or computer hardware. For example, many of the functions shown being performed in software in the specification could be performed in hardware in other embodiments, and vica versa.

Similarly, the neural tree network processes described above could all be run on one processor. Or if run on multiple processors, they could be run on multiple processors of many different kinds, including SMP, or symmetric multi-processing systems; massively parallel systems similar to that in FIG. 1 but having many more processors; or more loosely coupled networks of computers, such as networks of computer workstations.

Similarly, many embodiments of the invention will not use the master and slave paradigm described above. Furthermore, in many embodiments of the invention the tasks described above as being performed on only one processor could be run on multiple processors. For example, the task of training non-terminal nodes and using them to partition data for the training of leaf node neural networks should be parallelized if it will significantly increase the speed with which the tree can be built and trained. This would be the case if the number of non-terminal nodes becomes very large, or if the amount of computation associated with training each of them becomes large. For example, when the non-terminal nodes have hidden layers, as in FIG. 20, parallelization will tend to be more appropriate.

It should be understood that in embodiments of the invention running on symmetric multiprocessing, or SMP, systems there will be no need to store a separate copy of the neural network tree for each processor, since all the processors will share a common memory, and there will be no need for one processor to transfer the records associated with a given leaf node to the processor which is going to train that leaf node, since they will be distributed to the processor that is going to train their associated leaf node when that fetches them from memory, itself.

It should also be understood that, in some embodiments of the invention, neural tree networks similar to those shown in FIGS. 2 and 20 can be used to partition data for multiple processors which are using the data for purposes other than training hidden-layer neural networks. For example, such neural network trees can be used to partition data for parallel processors performing other types of modeling or analysis techniques, such as multi-dimensional statistical modeling, Kohonen networks, and discrimination trees. Similarly in some embodiments of the invention, the decision tree part of the entire neural tree network is replaced by another type of analytical classification algorithm, such as a Kohonen network, and the subsets of training data or apply data created by such a Kohonen network would be supplied to hidden layer neural networks. When used in a parallel environment the Kohonen network could be used to partition a training set into subsets, each representing classes of record.

Figure 18:
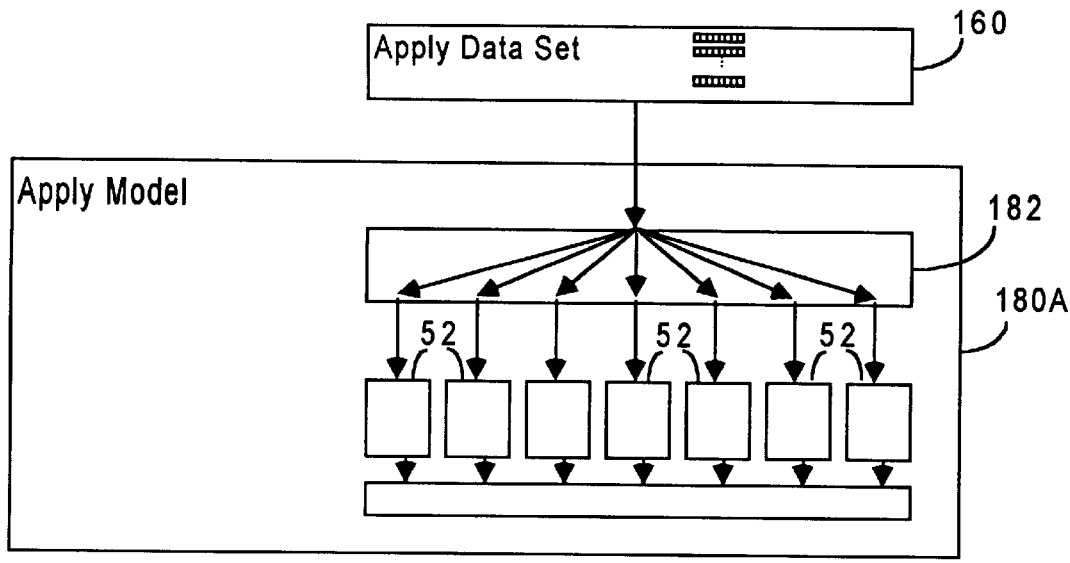
FIG. 18 is a schematic representation of the ApplyModel process when it is supplied with un-partitioned data.

In other embodiments of the invention, a neural tree network of the type shown in FIGS. 2 and 20 could be applied in a process similar to that shown in FIG. 14, except that the partitioner 182, shown in FIG. 18, associated with the Apply Model object would pass records through the compressed representation of the decision tree part of the neural tree network, and the individual parallel processors receiving a partition of data set record sent to it by the tree partitioner would pass those records through the compressed representation of the corresponding hidden layer neural network. In such an embodiment, the decision tree partitioner would decide which of the processors executing the hidden layer neural networks a given record should be sent to, based on which of the decision tree's leaf nodes the record is routed to. If the system is running more than one hidden layer neural network on any processor node, the partitioner must label records sent to such nodes, indicating which leaf node the record has been associated with.

One alternate embodiment of the hybrid tree network described in the above specification is described in a patent application (the "sibling patent") entitled "Apparatus And Methods For Programming Parallel Computers" filed on the same day as this patent application, on behalf of the intended assignee of the present application. This sibling patent, which has as named inventors, Michael J. Beckerle, James Richard Burns, Jerry L. Callen, Jeffrey D. Ives, Robert L. Krawitz, Daniel L. Leary, Steven Rosenthal, and Edward S. A. Zyszkowski, and having Ser. No. 08/627,801, filed Mar. 25, 1996, and is hereby incorporated herein by reference in its entirety.

What we claim is:

1. A computer system comprising:

P processors, where P is an integer greater than one;

means for receiving a data set of data objects having N parameters, where N is an integer greater than one;

means for dividing an N-dimensional data space having a separate dimension of each of said N parameters into M sub-spaces, each corresponding to a region of said N-dimensional space, where M is an integer greater than or equal to P, so each of said data set's data objects is located in one of said M sub-spaces, said means for dividing including means for dividing said space along boundaries which are non-orthogonal to said N dimensions; and means for associating different ones of said sub-spaces with different ones of said processors, such that each of said P processors has a different set of one or more of said sub-spaces associated with it, including:

means for distributing the sub-set of data objects located in each sub-space to the processor associated with that sub-space; and means for causing each processor to perform a computational process on each of the data objects so distributed to said processor.

2. A computer system comprising:

P parallel processors, where P is greater than one;

means for receiving a first data set of data objects to be processed;

d-tree means including:

means for storing a decision tree data structure having a plurality of non-terminal nodes, including a root node, and terminal nodes, wherein each of said non-terminal nodes has a plurality of child nodes, each of which is either one of said non-terminal or terminal nodes;

means for storing a trainable decision criterion for each of said non-terminal nodes; and means for training said decision tree including:

means for supplying a second set of said data objects to said root node as a training set, wherein said second set can either be equal to or different than said first set; and means for performing the following operation for each given non-terminal node in said tree;

causing each given non-terminal node to use those of said training set data objects supplied to it to train said given node's decision criterion; and supplying each training set data object supplied to the given node to one of the given node's child nodes based on the application of the given node's decision criteria to the data object, once the given node's decision criteria has been trained; and means for using said decision tree to partition said first data set into at least M data sub-sets, where M is equal or greater than P;

means for associating a different set of one or more of said data sub-sets with each of said P processors;

means for distributing the data objects in each data sub-set to the processor associated with that sub-set; and means for causing each of said processors to perform a computational process on each of said data objects so distributed to the processor.

3. A computer system as in claim 2 wherein said d-tree means performs the process of partitioning said first data set on less than one half the P processors when P is more than 2.

4. A computer system as in claim 2 wherein said training data set is a sub-set of said first data set.

5. A computer system as in claim 2 wherein said decision criterion associated with one or more of said non-terminal nodes is a neural network.

6. A computer system comprising:

P parallel processors, where P is greater than one;

means for receiving a first data set of data objects to be processed;

d-tree means for using a decision tree to partition said first data set into at least M data sub-sets, where M is equal or greater than P;

means for associating a different set of one or more of said data sub-sets with each of said P processors;

means for distributing the data objects in each data sub-set to the processor associated with that sub-set; and means for causing each of said processors to perform a computational process on each of said data objects so distributed to the processor;

wherein said d-tree means includes:

means for storing a decision tree data structure having a plurality of non-terminal nodes, including a root node, and terminal nodes, wherein each of said non-terminal nodes has a plurality of child nodes, each of which is either one of said non-terminal or terminal nodes;

means for storing a trainable decision criterion for each of said non-terminal nodes; and means for training said decision tree including:

means for supplying a second set of said data objects to said root node as a training set, wherein said second set can either be equal to or different than said first set; and means for performing the following operation for each given non-terminal node in said tree;

causing each given non-terminal node to use those of said training set data objects supplied to it to train said given node's decision criterion;

supplying each training set data object supplied to the given node to one of the given node's child nodes based on the application of the given node's decision criteria to the data object, once the given node's decision criteria has been trained; and wherein the decision criterion associated with one or more of said non-terminal nodes is a neural network and the decision criterion associated with at least one of said non-terminal node has a hidden layer.

7. A computer system as in claim 2 wherein the d-tree means further includes means for automatically setting the decision criteria of individual non-terminal nodes of the decision tree so as to achieve a desired ratio between the number of data objects supplied to each such node's child nodes.

8. A computer system comprising:

P parallel processors, where P is greater than one;

means for receiving a first data set of data objects to be processed;

d-tree means for using a decision tree to partition said first data set into at least M data sub-sets, where M is equal or greater than P;

means for associating a different set of one or more of said data sub-sets with each of said P processors;

means for distributing the data objects in each data sub-set to the processor associated with that sub-set; and means for causing each of said processors to perform a computational process on each of said data objects so distributed to the processor;

wherein said d-tree means includes:

means for storing a decision tree data structure having a plurality of non-terminal nodes, including a root node, and terminal nodes, wherein each of said non-terminal nodes has a plurality of child nodes, each of which is either one of said non-terminal or terminal nodes;

means for storing a trainable decision criterion for each of said non-terminal nodes;

means for training said decision tree including:

means for supplying a second set of said data objects to said root node as a training set, wherein said second set can either be equal to or different than said first set; and means for performing the following operation for each given non-terminal node in said tree;

causing each given non-terminal node to use those of said training set data objects supplied to it to train said given node's decision criterion;

supplying each training set data object supplied to the given node to one of the given node's child nodes based on the application of the given node's decision criteria to the data object, once the given node's decision criteria has been trained; and means for automatically setting the decision criteria of individual non-terminal nodes of the decision tree so as to achieve a desired ratio between the number of data objects supplied to each such node's child nodes; and means for automatically configuring the decision tree used so that it has P times I end nodes, where I is an integer, each of which end nodes defines one of said data sub-sets.

9. A computer system comprising:

means for receiving a data set of data objects having N parameters associated with them, where N is an integer greater than one;

means for dividing an N-dimensional data space having a separate dimension for each of said N parameters into M sub-spaces, each corresponding to a region of said N-dimensional space, where M is an integer greater than one, so each of said data set's data objects is located in one of said M sub-spaces;

means for representing each of M hidden layer neural networks;

means for associating each of the M sub-spaces with one of said M neural networks; and means for using the data objects in each of said M sub-spaces to train that sub-space's associated hidden layer neural network.

10. A computer system as in claim 9 wherein said means for dividing including means for dividing said space along boundaries which are non-orthogonal to said N dimensions.

11. A computerized method including:

receiving a first data set comprised of a plurality of data objects; and creating a decision tree data structure having a plurality of non-terminal nodes, including a root node, and terminal nodes, wherein each of said non-terminal nodes has a plurality of child nodes, each of which is either one of said non-terminal or terminal nodes, said creating of a decision tree including:

creating for each non-terminal node a neural network;

creating for each terminal node a neural network containing at least one hidden layer;

supplying a second data set of data objects to said root node as a training set, wherein said second data set can either be equal to or different than said first data set;

performing the following operation for each given non-terminal node in said tree;

using the training set data objects supplied to the given non-terminal node to train the given node's neural network; and supplying each data object of said first and second data sets supplied to the given node to one of the given node's child nodes based on the output of the given node's neural network for the data object, once the given node's neural net has been trained; and using said data objects of the first data set supplied to a given terminal node to train the given terminal node's hidden layer neural network.

12. A computerized method as in claim 11 wherein:

the data objects have N parameters associated with them, where N is an integer greater than one;

said using of training set data objects supplied to the given non-terminal node includes using said data objects to train the given non-terminal node's neural network to develop spatial criteria for dividing an N-dimensional data space having a separate dimension for each of said N parameters into a separate sub-space for each of the given non-terminal node's child nodes, each of which sub-spaces corresponds to a region of said N-dimensional space, so that each of said data objects supplied to the given node is located in one of said sub-spaces; and said supplying of data objects to a one of a given node's child nodes is based on the given node's neural network's spatial criteria, such that data objects from different sub-spaces of said N-dimensional space are supplied to different ones of the given node's child nodes.

13. A computerized method including:

receiving a first data set comprised of a plurality of data objects; and creating a decision tree data structure having a plurality of non-terminal nodes, including a root node, and terminal nodes, wherein each of said non-terminal nodes has a plurality of child nodes, each of which is either one of said non-terminal or terminal nodes, said creating of a decision tree including:

creating for each non-terminal node a neural network;

creating for each terminal node a neural network containing at least one hidden layer;

supplying a second data set of data objects to said root node as a training set, wherein said second data set can either be equal to or different than said first data set;

performing the following operation for each given non-terminal node in said tree;

using the training set data objects supplied to the given non-terminal node to train the given node's neural network; and supplying each data object of said first and second data sets supplied to the given node to one of the given node's child nodes based on the output of the given node's neural network for the data object, once the given node's neural net has been trained; and using said data objects of the first data set supplied to a given terminal node to train the given terminal node's hidden layer neural network; wherein:

the data objects have N parameters associated with them, where N is an integer greater than one;

said using of training set data objects supplied to the given non-terminal node includes using said data objects to train the given non-terminal node's neural network to develop spatial criteria for dividing an N-dimensional data space having a separate dimension for each of said N parameters into a separate sub-space for each of the given non-terminal node's child nodes, each of which sub-spaces corresponds to a region of said N-dimensional space, so that each of said data objects supplied to the given node is located in one of said sub-spaces;

said supplying of data objects to a one of a given node's child nodes is based on the given node's neural network's spatial criteria, such that data objects from different sub-spaces of said N-dimensional space are supplied to different ones of the given node's child nodes;

said creating of a neural network for each non-terminal node includes creating a two layer neural network for such a non-terminal node, each of which has a plurality of inputs, no hidden layers, an output, and a series of weights between each input and said output, which weights define a vector in said N-dimensional space; and said supplying of each given one of a plurality of training set data objects to one of a given non-terminal node's child nodes is based on which side of an N-dimensional plan perpendicular to said vector in said N-dimensional space that a given data object is located.

14. A computerized method as in claim 11 wherein said using of training set data objects supplied to a given terminal node includes using such data objects supplied to each of a plurality of said terminal nodes to train said terminal node's associated hidden layer neural network on a different parallel processor.

15. A computerized method including:
receiving a first data set comprised of a plurality of data objects; and
creating a decision tree data structure having a plurality of non-terminal nodes, including a root node, and terminal nodes, wherein each of said non-terminal nodes has a plurality of child nodes, each of which is either one of said non-terminal or terminal nodes, said creating of a decision tree including:
creating for each non-terminal node a neural network;
creating for each terminal node a neural network containing at least one hidden layer;
supplying a second data set of a data objects to said root node as a training set, wherein said second data set can either be equal to or different than said first data set; and
performing the following operation for each given non-terminal node in said tree;
using the training set data objects supplied to the given non-terminal node to train the given node's neural network; and
supplying each data object of said first and second data sets supplied to the given node to one of the given node's child nodes based on the output of the given node's neural network for the data object, once the given node's neural net has been trained;
using said data objects of the first data set supplied to a given terminal node to train the given terminal node's hidden layer neural network, including using such data objects supplied to each of a plurality of said terminal nodes to train said terminal node's associated hidden layer neural network on a different parallel processor;
storing a copy of said decision tree, including the neural networks in its non-terminal and terminal nodes on each of a plurality of processors;
dividing a set of data objects not in said training set into a plurality of data partitions, for each of said processors; and
passing the data objects in each given processor's associated partition down the copy of the decision tree stored on the given processor, so each given one of said processor's associated data objects is routed by the neural network in each of a succession of one or more non-terminal nodes to a respective child node, until the given data object is routed to a given terminal node in the processor's copy of the tree, after which the hidden layer neural network associated with said given terminal node is used to analyze the given data object.

16. A computerized method as in claim 11 wherein one or more of said non-terminal node's neural networks have hidden layers.

17. A computerized method including:
receiving a data set comprised of a plurality of data objects; and
creating a decision tree data structure having a plurality of non-terminal nodes, including a root node, and terminal nodes, wherein each of said non-terminal nodes has a plurality of child nodes, each of which is either one of said non-terminal or terminal nodes, said creating of a decision tree including:
creating for each non-terminal node a neural network, at least some of which include hidden layers;
creating for each terminal node a neural network;
supplying a plurality of said data objects to said root node as a training set; and
performing the following operation for each given non-terminal node in said tree;
using the training set data objects supplied to the given non-terminal node to train given node's neural network; and
supplying each training set data object supplied to the given node to one of the given node's child nodes based on the output of the given node's neural network for the data object, once the neural net has been trained.

18. A computer system including:
means for storing a representation of a neural network capable of calculating the values of J output parameters given the value of I input parameters, where I is an integer greater than one and J is an integer greater than zero;
means for receiving a data set comprised of a plurality of data objects, said data set having N parameters, where N is an integer equal to or greater than I and where the N parameters include at least the I parameters; and
means for associating a score, from a one dimensional range of values, with each given one of said data objects as a function of the values of the one or more J parameters calculated by said neural network for the values of said given data object's I parameters;
means for selecting a continuous range of said scores having a predetermined percent of the data objects associated with said range; and
means for selecting the set of data objects associated with said selected range.

19. A computerized method including:
receiving a data set comprised of a plurality of data objects, each of which includes a corresponding set of parameters; and
creating a decision tree data structure having a plurality of non-terminal nodes, including a root node, and terminal nodes, wherein each of said non-terminal nodes has a plurality of child nodes, each of which is either one of said non-terminal or terminal nodes, said creating of a decision tree including:
creating for each non-terminal node a neural network, having a set of input nodes, a set of one or more output nodes, and a set of weights determining which values will be produced at each output node when a given set of parameter values are supplied to the network's input nodes;
supplying a plurality of said data objects to said root node as a training set; and
performing the following operation for each given non-terminal node in said tree;
using the training set data objects supplied to the given non-terminal node to train the given node's neural network by applying, for each data object, to each of the neural network's input nodes the value from a corresponding input subset of said data object's associated parameters, and using the difference between the resulting set of values produced at the neural network's one or more output nodes and the values of a corresponding output subset of said data object's parameters to update the neural network's weights so as to reduce that difference; wherein said training includes selecting for each given non-terminal node which of the parameters associated with the data objects supplied to the given non-terminal node are to be as said output subset as a function of the data objects supplied to that node; and supplying each data object supplied to the given node to one of the given node's child nodes based on the output of the given node's neural network for the data object, once the given node's neural net has been trained.

20. A computer-implemented method for parallel processing of data, comprising:

determining from the data at least one principle axis of the data;

partitioning the data into a plurality of convex sets of data alone at least one plane orthogonal to each determined principle axis of the data corresponding to a number of processors; and in parallel, processing the convex sets of data using a plurality of analytic models on the processors, wherein each processor receives one of the convex sets of data and uses one of the plurality of analytical models.

21. A computer system method for parallel processing of a data, comprising:

means for determining from the data at least one principle axis of the data;

means for partitioning the data into a plurality of convex sets of data along at least one plane orthogonal to each determined principle axis of the data corresponding to a number of processors; and for processing the convex sets of data using a plurality of analytical models in parallel on the plurality of processors, wherein each processor receives one of the convex sets of data and uses of the plurality of analytical models.

* * * * *